US 6,523,461 B1

(12) United States Patent
Johnston et al.

(10) Patent No.: US 6,523,461 B1
(45) Date of Patent: Feb. 25, 2003

(54) CHARCOAL TRAY AND COOKING RACK FOR DUAL FUEL BARBEQUE GRILL

(75) Inventors: Robert Johnston, Columbus, GA (US); Bradley R. Gillespie, Columbus, GA (US)

(73) Assignee: W. C. Bradley Company, Columbus, GA (US)

( * ) Notice: Subject to any disclaimer, the term of this patent is extended or adjusted under 35 U.S.C. 154(b) by 0 days.

(21) Appl. No.: 10/215,496

(22) Filed: Aug. 8, 2002

(51) Int. Cl.$^7$ .............................. A47J 37/00; A47J 37/07
(52) U.S. Cl. .............................. 99/340; 99/446; 99/450; 99/482; 126/25 R; 126/41 R
(58) Field of Search .................. 99/339, 340, 357, 99/444–450, 481, 482; 126/25 R, 9 R, 9 A, 39 R, 41 R, 25 A, 25 B, 39 E; 426/523; 44/450, 522, 533, 540; D7/359, 360

(56) References Cited

U.S. PATENT DOCUMENTS

| | | | | |
|---|---|---|---|---|
| 3,824,984 A | * | 7/1974 | Swanson et al. | 126/25 R |
| 4,140,049 A | * | 2/1979 | Stewart | 126/25 R |
| 4,508,024 A | * | 4/1985 | Perkins | 99/340 |
| 4,553,524 A | * | 11/1985 | Wheat et al. | 126/41 R |
| 4,628,897 A | * | 12/1986 | Stanfa et al. | 126/41 R |
| 4,777,927 A | * | 10/1988 | Stephen et al. | 126/25 R |
| 4,966,125 A | * | 10/1990 | Stephen et al. | 99/342 |
| 5,031,602 A | * | 7/1991 | Vick | 99/339 |
| 5,065,734 A | * | 11/1991 | Elliott | 126/9 R |
| 5,070,857 A | * | 12/1991 | Sarten | 126/25 A |
| 5,197,379 A | * | 3/1993 | Leonard, Jr. | 99/446 |
| 5,259,299 A | * | 11/1993 | Ferraro | 99/340 |
| 6,173,644 B1 | * | 1/2001 | Krall | 99/340 |

* cited by examiner

Primary Examiner—Timothy F. Simone
(74) Attorney, Agent, or Firm—James W. Kayden; Thomas, Kayden, Horstemeyer & Risley, LLP

(57) ABSTRACT

An apparatus configured to permit the use of charcoal for cooking in a gas barbecue grill, the gas grill having a bottom casting containing a gas burner element, a cooking rack supported thereabove, and a top casting rotatably affixed thereto. The apparatus includes a tray configured to be received within the bottom casting and the tray includes a pair of handles. Each of the handles includes a proximal end and a distal end, and the handles are rotatably connected to the tray at the proximal ends and the distal ends are configured to support the cooking rack.

16 Claims, 3 Drawing Sheets

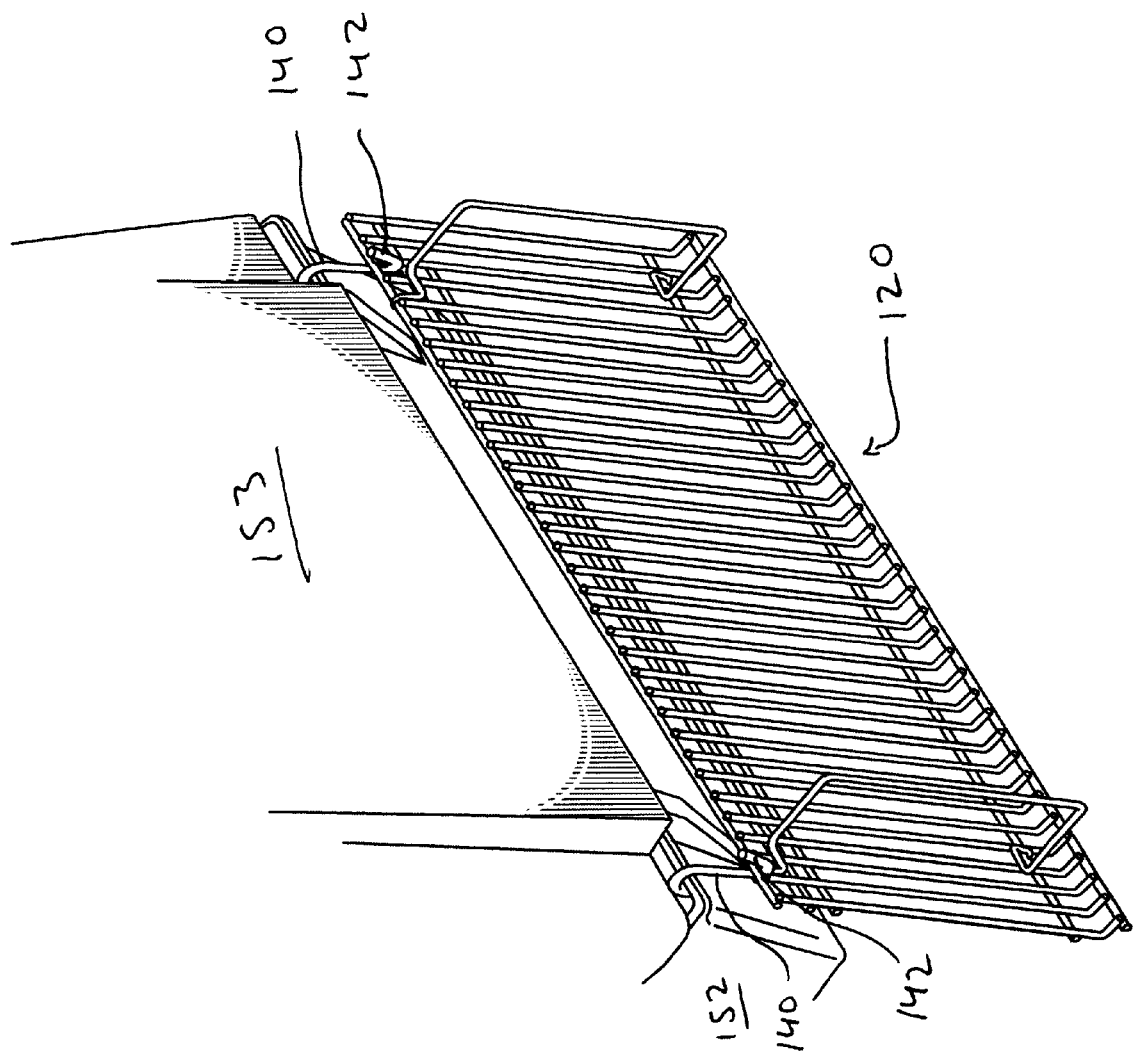

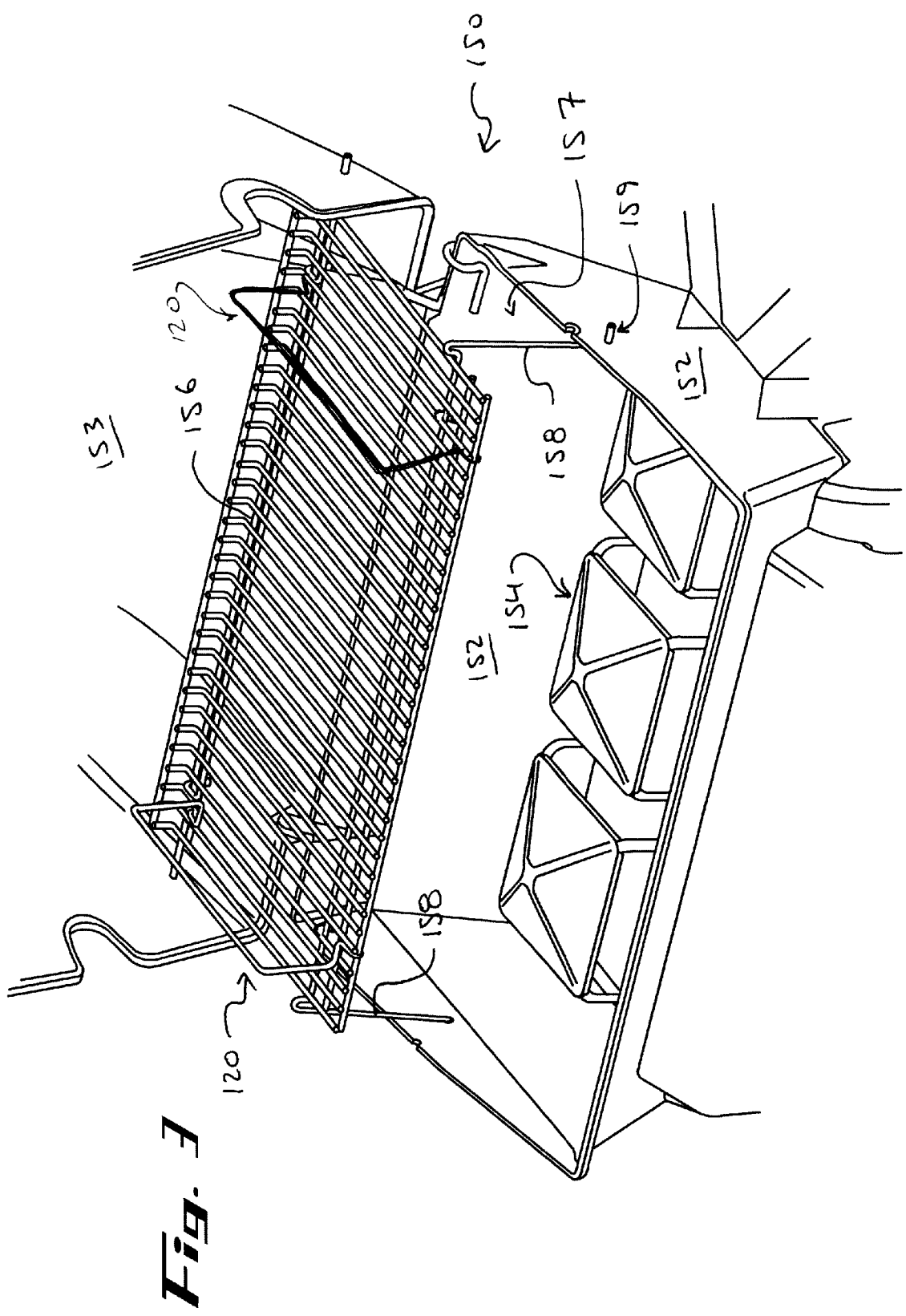

CHARCOAL TRAY AND COOKING RACK FOR DUAL FUEL BARBEQUE GRILL

TECHNICAL FIELD

The present invention relates generally to barbecue grills, and, more particularly, to a charcoal tray and cooking rack for use in a gas barbecue grill.

BACKGROUND OF THE INVENTION

In the recent past, outdoor cooking has experienced tremendous growth. This is due in large part to the fact that barbecue grills, both charcoal and gas, have become much easier to use and more efficient at cooking a wide range of food items. Although both charcoal and gas barbecue grills have seen improvements in the recent years, the advantages of gas barbecue grills have been well recognized. Gas barbecue grills can quickly bring a heated surface to a desired temperature and may provide a high rate of heat exchange. Therefore, gas barbecue grills generally require less time to prepare food items than the charcoal grills. Gas barbecue grills allow for finer control of cooking temperatures than do charcoal barbecue grills. Even with these noted advantages, there are still those individuals who would prefer to cook using a charcoal barbecue grill.

Charcoal barbecue grills offer a number of advantages as well. For example, charcoal barbecue grills tend to be of simple construction, and therefore, tend to cost less than gas barbecue grills. As well, charcoal barbecue grills do not require an external fuel source, such as, a liquid propane tank. Although means do exist for determining the amount of propane in a tank, it is not uncommon to run out of fuel while preparing food items on a gas grill. Many individuals also prefer the flavor imparted to food items by cooking with charcoal briquettes. Similarly, charcoal barbecue grills allow individuals to use such items as wood chips to further flavor the food items they are preparing. Gas barbecue grills tend to cost more to operate than charcoal barbecue grills because the fuel source must be continually resupplied and items such as replacement burner elements must be purchased periodically to maintain proper operation of the gas barbecue grill.

The Krall patent, U.S. Pat. No. 6,173,644, issued Jan. 16, 2001, discloses an apparatus for converting a gas grill into a charcoal burning grill for conveniently using charcoal or other flammable material in a gas grill. The adapter includes an adapter container for holding flammable material and the adapter container is removably positionable in the interior of the housing. Once the adapter container is positioned in the housing, a screen that is removably supported by the housing is replaced such that the screen covers the adapter container. However, because the screen is supported by the housing, the height of the screen above the adapter container can not be easily adjusted.

Therefore, a need exists for improved barbecue grills that can function in both the gas and charcoal modes.

SUMMARY OF THE INVENTION

Embodiments of the present invention include an apparatus configured to permit the use of charcoal for cooking in a gas barbecue grill, the gas grill having a bottom casting containing a gas burner element, a cooking rack supported thereabove, and a top casting hingedly affixed thereto. The apparatus configured for use with a gas grill comprises a tray adapted to be received within the bottom casting, the tray including a pair of handles. Each of the handles includes a proximal end and a distal end. The handles are rotatably connected to the tray at the proximal ends and the distal ends are configured to support the cooking rack. The handles are rotatable between a stowed position and a support position, the stowed position allowing the cooking rack to be disposed on the bottom casting and the support position allowing the cooking rack to be supported by the distal ends of the handles.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE DRAWINGS

The present invention, as defined in the claims, can be better understood with reference to the following drawings. The components in the drawings are not necessarily to scale relative to each other, emphasis instead being placed upon clearly illustrating the principles of the present invention.

FIG. 2 is a perspective view of the gas barbecue grill as shown in FIG. 1, with the cooking rack shown in the stowed position.

FIG. 3 is a perspective view of the gas barbecue grill as shown in FIG. 1, with the cooking rack positioned for operation of the gas barbecue grill in the gas mode.

DETAILED DESCRIPTION OF THE PREFERRED EMBODIMENT

Figure 1:
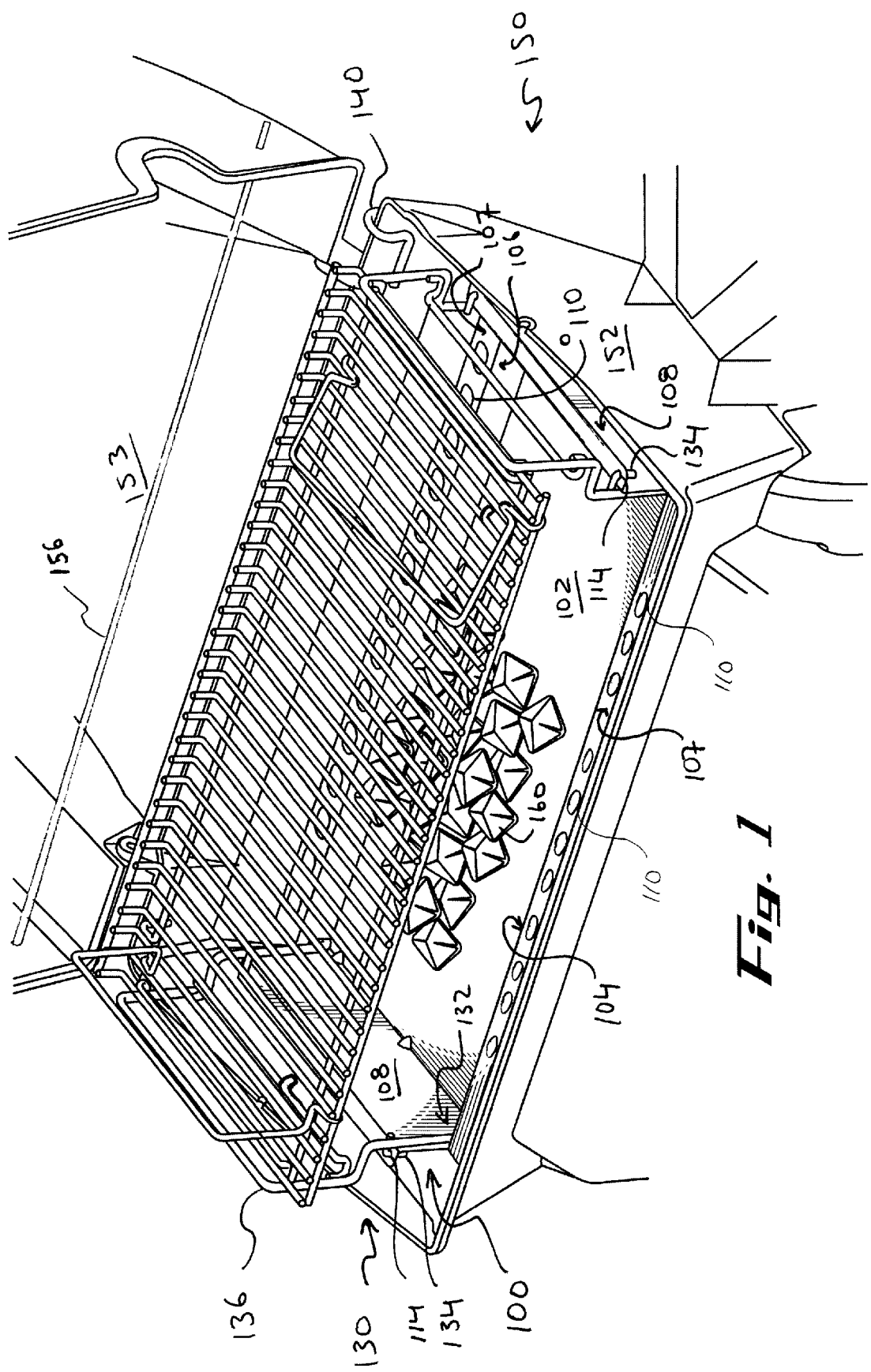
FIG. 1 is a perspective view of a gas barbecue grill including a charcoal tray and associated cooking rack constructed according to an embodiment of the present invention.

In the following detailed description, reference is made to the accompanying drawings which form a part hereof, and in which are shown by way of illustration specific embodiments of a charcoal tray and associated cooking rack for use in a gas barbecue grill. It is to be understood that other embodiments may be utilized in structural or processed changes may be made. The following detailed description, therefore, is not to be taken in a limiting sense.

Referring now to the figures, wherein like reference numerals indicate corresponding components throughout the several views, one example of a charcoal tray and associated cooking rack constructed in accordance with the present invention is illustrated in FIG. 1. A preferred embodiment includes a charcoal tray 100 and a convertible cooking rack 120 disposed within the bottom casting 152 of a gas barbecue grill 150, above the gas burner elements 154 (FIG.3). The charcoal tray 100 includes a firepan 102, a front wall 104, a back wall 106, a pair of side walls 108 and a pair of handles 130. The charcoal tray 100 is sized to substantially span the interior of the bottom casting 152. As such a plurality of vents 110 are formed in both the front wall 104 and back wall 106. As shown, each of the front and back walls 104, 106 includes a substantially horizontal ledge 107 in which the vents 110 are located. The vents 110 insure that adequate airflow exists within the barbecue grill to support combustion of both charcoal and/or the fuel provided to the gas burner elements 154 and provide additional heat transfer between the burner element or elements and the charcoal being ignited. For convenience, the convertible cooking rack 120 is provided with a pair of lifting members 122. The charcoal tray 100 can also be sized such that the tray 100 does not span the entire interior of the bottom casting 152. Such embodiments allow the gas barbecue grill 150 to be used in the gas mode and charcoal mode simultaneously.

The handles 130 are rotatably connected to the charcoal tray 100 such that they can be moved between a support position and a stowed position. Each handle includes a proximal end 132 and a distal end 136. The proximal ends 132 are rotatably connected to the charcoal tray 100 in any suitable fashion. Preferably, the proximal ends 132 of the handles are outwardly depending and fit into corresponding apertures in the charcoal tray 100. The distal ends 136 of the handles 130 are configured to support the convertible cooking rack 120 at opposing ends thereof. Preferably, the distal ends 136 are configured such that the convertible cooking rack 120 can be supported at a number of different levels above the charcoal tray 100. For added stability, it is desirable to secure the handles 130 in the support position during use of the convertible cooking rack 120. As shown, this is accomplished by engaging one or more securing apertures 114 formed in the charcoal tray 100 with downwardly depending pins 134. To place the handles in the stored position, the user simply lifts up slightly on each handle 130 to disengage the downwardly depending pins 134 from the securing apertures 114 and rotates them inwardly until they contact the fire pan.

As shown in FIG. 2, the preferred embodiment includes a hanging member 140 that is used to stow both the charcoal tray 100 (FIG. 1) and the convertible cooking rack 120 when they are not in use. The hanging member 140 includes a pair of hooks 142 and is disposed along the back edge of the bottom casting 152. This configuration allows the charcoal tray 100 and convertible cooking rack 120 to be safely stored out of the way and allows the use of the barbecue grill 150 in the gas mode.

As shown in FIG. 3, the convertible cooking rack 120 may also be used when the barbecue grill 150 is functioning in the gas mode. When the convertible cooking rack 120 is used in this manner, it is supported by a bar 156 disposed in the upper casting 153 and a support element 157 rotatably attached to the bottom casting 152. Preferably, the support element 157 includes a pair of legs 158 and a horizontal member disposed therebetween, upon which the convertible cooking rack 120 rests. Each leg 158 includes an outwardly depending end 159 configured to rotatably engage the bottom casting 152, thereby connecting the support element 157 to the bottom casting 152. The convertible cooking rack 120 is maintained in a substantially horizontal disposition above a primary cooking rack (not shown) as the upper casting 153 is moved between an open and a closed position.

OPERATION

As previously noted, the charcoal tray 100 allows a gas barbecue grill 150 to be operated in either a gas mode or a charcoal mode. To operate in the charcoal mode, the charcoal tray 100 is removed from the stowed position and is placed in the bottom casting 152 above the gas burner elements 154 (FIG. 3). Preferably, the handles 130 are secured in the support position by placing the downwardly depending pins 134 in the securing apertures 114 formed in the charcoal tray 100. Charcoal 160 is placed in the fire pan 102 and ignited. Ignition of the charcoal can be accomplished with an external flame, such as a match, lighter, etc., or preferably, can be accomplished by using the gas burner elements 154. Once the charcoal 160 has been adequately lit, the fuel source to the gas burner elements 154 is secured.

Note, however, use of the gas burner elements 154 is not required, meaning the charcoal tray 100 can be used even when no external fuel source is available.

Once the charcoal 160 is lit, the convertible cooking rack 120 is supported at the desired level above the charcoal tray 100 by the distal ends 136 of the handles 130. Note that the charcoal tray 100 may also be used with the primary cooking rack (not shown) of the barbecue grill 150. Typically, the primary rack is supported by the bottom casting 152. To use the primary rack with the charcoal tray 100, the handles 130 are simply rotated into the stowed position and the primary rack positioned on the bottom casting 152 such as it would be placed during regular gas mode operation. Using the primary rack in this fashion permits the user to position the convertible cooking rack 120 on the bar 156 and support element 157, as shown in FIG. 3, and effectively increase the amount of cooking surface that is available. Embodiments are also envisioned where it is possible to support the primary cooking rack on the distal ends 136 of the handles 130.

During gas mode operations, the charcoal tray (FIG. 1) is placed on the hanging member 140 along with the convertible cooking rack 120, or the rack 120 may be used as a cooking surface, as is shown in FIG. 3.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. An apparatus configured to permit the use of charcoal for cooking in a gas barbecue grill, the gas grill having a bottom casting containing a gas burner element, a cooking rack supported thereabove and a top casting hingedly affixed thereto, said apparatus comprising:

a tray configured to be received within the bottom casting, said tray including a pair of handles, each of said handles having a proximal end and a distal end, said handles being rotatably connected to said tray at said proximal ends and said distal ends are configured to support the cooking rack; and wherein said handles are rotatable between a stowed position and a support position, said stowed position allowing the cooking rack to be disposed on the bottom casting and said support position allowing the cooking rack to be supported by said distal ends.

2. The apparatus of claim 1, further comprising:

a bar disposed in the upper casting;

a support element rotatably attached to the bottom casting;

a convertible cooking rack removably supported by said bar and said support element such that said convertible cooking rack remains in a substantially horizontal disposition as the upper casting is rotated between an open and a closed position; and wherein said convertible cooking rack is configured to be supported by said distal ends of said handles.

3. The apparatus of claim 1, wherein said handles further include locking members configured to secure said handles in said support position.

4. The apparatus of claim 1, wherein said distal ends are further configured to support the cooking rack at a plurality of levels above said tray.

5. The apparatus of claim 2, wherein said convertible cooking rack further includes a pair of lifting members attached thereto.

6. The apparatus of claim 2, wherein said support element further includes a pair of legs, a horizontal member disposed there between, and a pair of outwardly depending pins disposed on each of said legs, said pins being configured to rotatably engage the bottom casting.

7. The apparatus of claim 1, wherein said tray further includes:

a fire pan, a front wall and a back wall connected to said fire pan, a front ledge and a back ledge connected to said front and back walls, respectively, a plurality of vents disposed in said front and back ledges; and wherein said tray substantially spans an interior portion of the bottom casting and said vents provide adequate air flow within the gas grill when said tray is disposed in the bottom casting.

8. The apparatus of claim 1, further comprising a hanging member including a pair of hooks, wherein said hanging member is disposed on the bottom casting and is configured to support said tray when said tray is not in use.

9. A gas barbecue grill, comprising:

a bottom casting containing a gas burner element, a cooking rack supported thereabove, a top casting rotatably affixed thereto;

a tray configured to be received within the bottom casting, said tray including a pair of handles, each of said handles having a proximal end and a distal end, said handles being rotatably connected to said tray at said proximal ends and said distal ends are configured to support the cooking rack; and wherein said handles are rotatable between a stowed position and a support position, said stowed position allowing the cooking rack to be disposed on the bottom casting and said support position allowing the cooking rack to be supported by said distal ends.

10. The gas barbecue grill of claim 9, further comprising:

a bar disposed in the upper casting;

a support element rotatably attached to the bottom casting;

a convertible cooking rack removably supported by said bar and said support element such that said convertible cooking rack remains in a substantially horizontal disposition as the upper casting is rotated between an open and a closed position; and wherein said convertible cooking rack is configured to be supported by said distal ends of said handles.

11. The gas barbecue grill of claim 10, wherein said handles further include locking members configured to secure said handles in said support position.

12. The gas barbecue grill of claim 10, wherein said distal ends are further configured to support the cooking rack at a plurality of levels above said tray.

13. The gas barbecue grill of claim 10, wherein said convertible cooking rack further includes a pair of lifting members attached thereto.

14. The gas barbecue grill of claim 10, wherein said support element further includes a pair of legs, a horizontal member disposed there between, and a pair of outwardly depending pins disposed on each of said legs, said pins being configured to rotatably engage the bottom casting.

15. The gas barbecue grill of claim 10, wherein said tray further includes:

a fire pan, a front wall and a back wall connected to said fire pan, a front ledge and a back ledge connected to said front and back walls, respectively, a plurality of vents disposed in said front and back ledges; and wherein said tray substantially spans an interior of the bottom casting and said vents provide adequate air flow within the gas grill when said tray is disposed in the bottom casting.

16. The gas barbecue grill of claim 10, further comprising a hanging member including a pair of hooks, wherein said hanging member is disposed on the bottom casting and is configured to support said tray when said tray is not in use.

* * * * *